United States Patent
Kim et al.

(10) Patent No.: US 7,610,442 B2
(45) Date of Patent: Oct. 27, 2009

(54) DUAL JOURNALING STORE METHOD AND STORAGE MEDIUM THEREOF

(75) Inventors: Jeong-Ki Kim, Daejeon (KR); Dong-Suk Bae, Seoul (KR); Yang-Gi Kim, Seoul (KR); Seung-Min Park, Daejeon-si (KR); Chae-Kyu Kim, Daejeon-si (KR)

(73) Assignee: LG Electronics Inc., Seoul (KR)

(*) Notice: Subject to any disclaimer, the term of this patent is extended or adjusted under 35 U.S.C. 154(b) by 661 days.

(21) Appl. No.: 10/539,751

(22) PCT Filed: Dec. 19, 2003

(86) PCT No.: PCT/KR03/02783

§ 371 (c)(1), (2), (4) Date: Jun. 20, 2005

(87) PCT Pub. No.: WO2004/059624

PCT Pub. Date: Jul. 15, 2004

(65) Prior Publication Data

US 2006/0085493 A1    Apr. 20, 2006

(30) Foreign Application Priority Data

Dec. 24, 2002 (KR) .................. 10-2002-0083165
Dec. 17, 2003 (KR) .................. 10-2003-0092533

(51) Int. Cl.
*G06F 12/00* (2006.01)

(52) U.S. Cl. .................. 711/112; 711/103; 707/206

(58) Field of Classification Search .................. 711/103
See application file for complete search history.

(56) References Cited

U.S. PATENT DOCUMENTS

| | | | |
|---|---|---|---|
| 5,220,657 A | 6/1993 | Bly et al. | 395/425 |
| 5,404,485 A | 4/1995 | Ban | 395/425 |
| 5,491,780 A | 2/1996 | Fyles et al. | 395/153 |
| 5,504,861 A | 4/1996 | Crockett et al. | 395/182.11 |
| 5,581,724 A | 12/1996 | Belsan et al. | 395/441 |
| 5,592,618 A | 1/1997 | Micka et al. | 395/185.07 |
| 5,623,599 A | 4/1997 | Shomler | 395/182.16 |

(Continued)

FOREIGN PATENT DOCUMENTS

CN   1493026 A   4/2004

(Continued)

OTHER PUBLICATIONS

Russian Office Action dated Feb. 16, 2007.

(Continued)

*Primary Examiner*—Matt Kim
*Assistant Examiner*—Ryan Dare
(74) *Attorney, Agent, or Firm*—KED & Associates LLP

(57) ABSTRACT

A dual journaling storing method and a storage medium thereof are provided, in which data are stored toward a central portion of a storage space of the storage medium from start and end locations when a flash memory or the like is used as a storage medium for storing/managing/processing data. One data is stored from a start location of the storage medium based on the journaling method, and another data is stored from an end location of the storage medium toward the start location.

23 Claims, 10 Drawing Sheets (a) State of when there is no storage space for Data10

(b) State of when head of rear journaling moves central location

U.S. PATENT DOCUMENTS

| | | | |
|---|---|---|---|
| 5,734,861 A | 3/1998 | Cohn et al. | 395/461 |
| 5,832,522 A | 11/1998 | Blickenstaff et al. | 707/204 |
| 5,907,854 A | 5/1999 | Kerns | |
| 6,128,630 A | 10/2000 | Shackelford | 707/204 |
| 6,260,103 B1 * | 7/2001 | Alexis et al. | 711/103 |
| 6,725,241 B1 * | 4/2004 | Rodriguez et al. | 707/203 |
| 2001/0013269 A1 * | 8/2001 | Tanji | 84/601 |
| 2002/0055941 A1 | 5/2002 | Kolodner et al. | |
| 2005/0108447 A1 * | 5/2005 | Thadani | 710/22 |
| 2005/0132126 A1 * | 6/2005 | Lin et al. | 711/103 |

FOREIGN PATENT DOCUMENTS

| | | |
|---|---|---|
| EP | 1 046 980 | 10/2000 |
| FR | 2 790 321 | 9/2000 |
| JP | 4-153792 | 5/1992 |
| JP | 4-213129 | 8/1992 |
| JP | 6-282702 | 10/1994 |
| JP | 7-191892 | 7/1995 |
| JP | 9-231110 | 9/1997 |
| KR | 10-20002-0084629 A | 11/2002 |
| WO | WO 2007066909 A1 * | 6/2007 |

OTHER PUBLICATIONS

Japanese Office Action dated Aug. 21, 2008.
European Search Report dated Mar. 26, 2009.

* cited by examiner

Fig.2
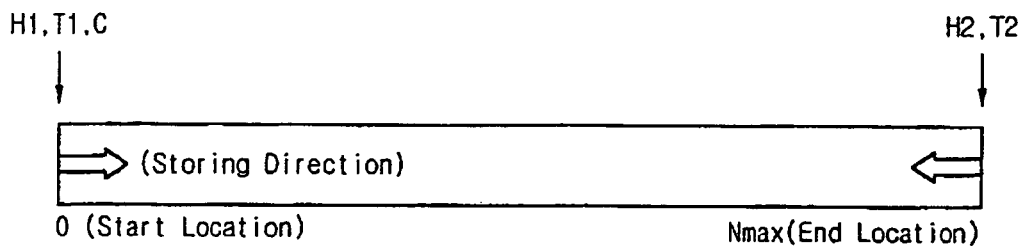
(a) State of when Data whose size is S is stored
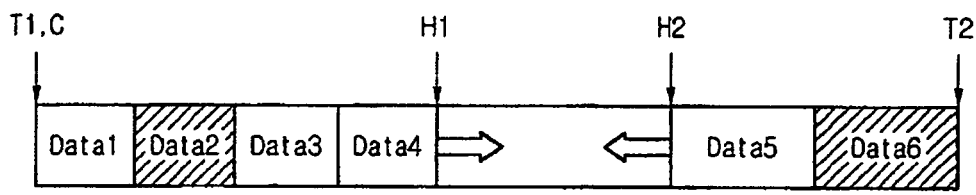
(b) State of when six data are stored and Data2 and Data6 are erased
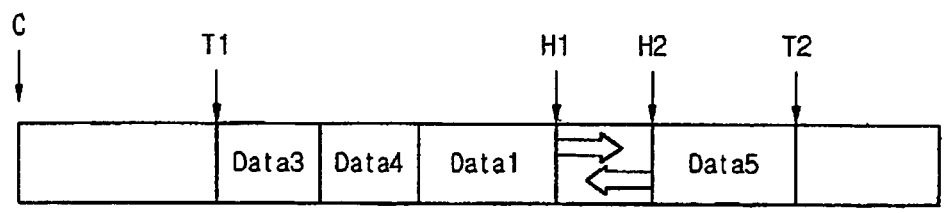
(c) State of when Data1 moves for GC, invalid space is erased and Data7 is stored
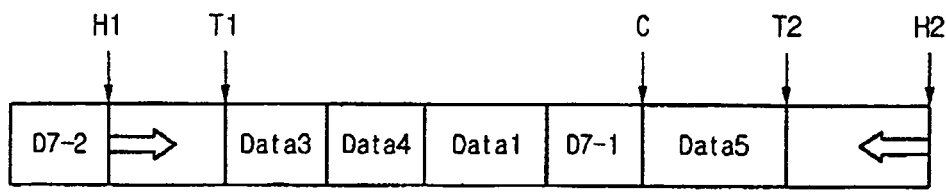
(d) State of when Data7 is stored and central location is determined Fig.3
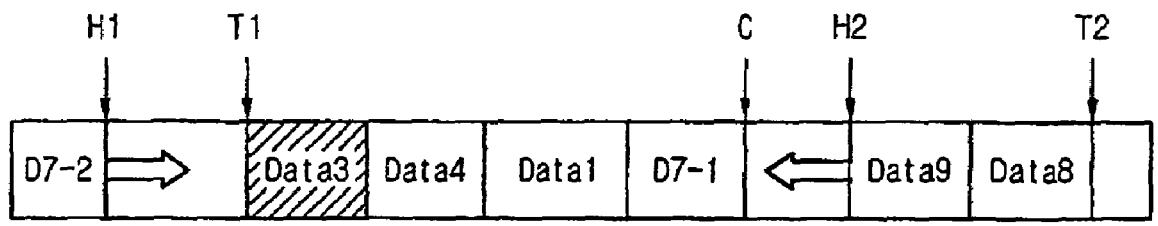
(a) State of when there is no storage space for Data10
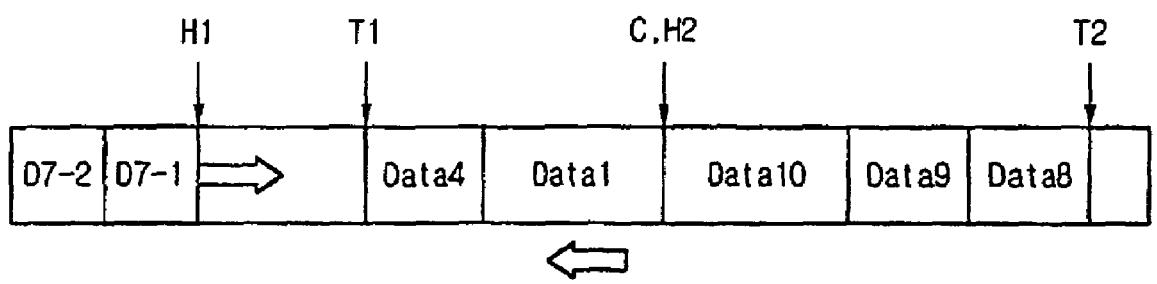
(b) State of when head of rear journaling moves central location

DUAL JOURNALING STORE METHOD AND STORAGE MEDIUM THEREOF

This application claims priority to PCT/KR2003/002783, filed Dec. 19, 2003, which published on Jul. 15, 2004 with Publication No. WO 2004/059624 A1 in the English language and which claimed priority to Korean Application Nos. 10-2002-0083165 filed Dec. 24, 2002 and 10-2003-0092533 filed Dec. 17, 2003.

TECHNICAL FIELD

The present invention relates to a dual journaling storing method and a storage medium thereof, in which data are stored toward a central portion of a storage space of the storage medium from start and end locations when a flash memory or the like is used as a storage medium for storing/managing/processing data.

BACKGROUND ART

In recent years, as information society and mobile computing technology are rapidly advanced, personal digital assistants (PDA), hand-held personal computer (HPC), cellular phone, e-book and the like have been developed. In addition, for the purpose of data storage, many flash memories are widely used because they are very handy to carry and have a fast access time and a low power consumption.

A flash memory has features different from a general random access memory (RAM). The flash memory can be non-volatile and firmer than a hard disk drive. Additionally, the flash memory can operate with low power and has an access time as fast as the RAM. Further, the flash memory is adaptable to portable devices because of its small size.

However, the flash memory is five to ten times more expensive than the hard disk drive and has a disadvantage in that a cleaning operation must be carried out in order to write a new data to a space where data has already existed.

For instance, while 28F640J3A flash memory developed by Intel Corporation has a fast read speed of 100 to 150 nsec, which is similar to the RAM, its write speed and erase speed are relatively slow. It takes 218 μsec to write data when 32-byte buffer is used, and a write time of an erase block unit is 0.8 sec per block.

In addition, an erase block size that can be erased at a time is constantly 128 Kbytes. The flash memory can perform erase/write operations 100,000 times at a room temperature. Such a space of the flash memory, which can be erased at a time, is called "erase block" or "segment".

Flash memories can be classified into NOR type, NAND type and AND type according to cell structures. Generally, the NOR or NAND flash memory is widely used. The NOR flash memory has a fast random-access read speed and an easiness of access per bit. Therefore, the NOR flash memory is directly connected to a memory address space and mainly used to store codes executed by CPU. Meanwhile, the NAND flash memory has a relatively slow random access time, so that it is mainly used to store relatively large data, such as music files or image files, at a time.

Conventional file systems using these flash memories are disclosed in U.S. Pat. No. 5,404,485, entitled. "Flash Memory System", and in a paper "A Flash Memory Based File System", pp. 155-164, published at USENIX conference in 1995.

Additionally, there is provided a journaling flash file system (JFFS), in which a log-structured file system is applied to a flash memory. The log-structured file system is disclosed in U.S. Pat. No. 6,128,630 entitled "Journal space release for log-structured storage systems" and U.S. Pat. No. 5,530,850 entitled "Data storage library array with log-structured file system which allows simultaneous write and garbage collection".

When a file system is configured in a hard disk drive and data is stored, the log-structured file system employs a journaling storing method. Accordingly, the log-structured file system has an advantage in that versions of a previous data and a new modified data can be maintained in a log format. Further, erroneous data can be restored to the previous data.

The JFFS was developed by Axis Communications of U.S.A, and JFFS2 has been developed under GNU public licenses (GPL) of free software foundation (FSF) by RedHat of U.S.A.

FIG. 1 is an exemplary view of a storing method of JFFS2 which configures a file system of a flash memory.

In FIG. 1, there is shown one example of storing data into the flash memory in the JFFS. In case there is a directory structure in a certain file system, for example, EXT2 of Linux, a directory entry (Dir 1 entry) is stored in order to contain a general characteristic of one directory, as shown in FIG. 1(a). Here, the stored information is a directory node type, a total length of node, a cyclic redundancy check (CRC) of head, parent inode number, version value, node CRC, name CRC, directory name, etc.

As shown in FIG. 1, a directory inode (Dir 1 inode) is stored after the directory entry (Dir 1 entry). The information stored in the directory inode (Dir 1 inode) includes a node type, a total length, various kinds of CRC, version value, user ID, group ID, created time, accessed time, modified time, etc.

The directory entry and the directory inode are additional information used only in the file system, not information that is visible to the user. They are called "meta data". In the same manner, when a file contained in the directory is stored, a file entry (File 1 entry) and a file inode (File 1 inode) are stored sequentially.

The directory and the file are considered as the same format in the file system. However, while there is no actual data in the directory, a file data (File 1 data) is stored after the file inode (File 1 node).

In this manner, the JFFS employs a method for journaling the directory and file of the flash memory. As shown in FIG. 1(b), if the directory inode (Dir 1 inode) and the file inode (File 1 inode) are changed and updated with new values, the original meta data are changed into an invalid state and new data are sequentially stored in storage locations.

At this time, the invalid state is only to indicate that the data are an unnecessary data, not to actually erase the data. Version values of the new data increase by one stage. Therefore, if a problem occurs in the new data, data can be easily restored only if there are the data of the previous version.

In this manner, if the directory and the file are updated and new data are stored many times, the storage space of the flash memory reaches the limit. Thus, data stored in the flash memory must be erased in order to secure the storage space. Since the data must be erased only by the erase block unit due to the characteristic of the flash memory, the valid data (Dir 1 entry) moves as shown in FIG. 1(c). Then, if the erase block is filled with invalid spaces, the cleaning operation is carried out to erase one erase block, as shown in FIG. 1(d).

The above process of securing the new storage space is called "garbage collection (GC)" In other words, when it is necessary to secure the new storage space for lack of the storage space, the garbage collection is carried out by collecting the invalid spaces and cleaning the erase block by the erase block unit. In addition, the space where the new data created through the cleaning operation can be stored is called "free space". By securing large free space, data can continue to be stored.

In case the hard disk drive is used as the storage medium, data can be stored in the similar manner. In case of the hard disk drive, however, the invalid data does not move and the invalid block having the erase block size is not created in order to secure the storage space.

However, in order to obtain the fast access to the file in the hard disk drive, several pieces of the same file are collected and moved to a physically adjacent location. Since the hard disk drive need not perform the cleaning operation separately, the data are directly stored if the space where the new data are stored is in the invalid state.

If the storing method of the JFFS is carried out, the locations of the entry and the inode are mixed complicatedly with the data of the file. Therefore, when the file system is configured by connecting and mounting the flash memory and an operating system (OS), the entire space of the flash memory must be read out and the metal data must be found in order to configure the tree-type directory structure.

The same problem also occurs when a log-structured file system or a journaling file system is configured using the hard disk drive as the storage medium, instead of the flash memory. In other words, although the data need not move in order to collect the erase block like the case of the flash memory, the access speed becomes 40-50 times slower than the flash memory because the meta data are mixed with the data of the file and scattered throughout the space. In addition, it takes much time to configure the file system by reading out the entire disk whose capacity can be more than gigabytes.

The hard disk drive mainly uses the log-structured file system or the journaling file system to store and reproduce a large-size multimedia data. However, the utility as the multimedia file system is degraded if the data is not transmitted at a constant speed per predetermined time due to the mixture of the meta data.

DISCLOSURE OF THE INVENTION

Accordingly, the present invention is directed to a dual journaling storing method that substantially obviates one or more of the problems due to limitations and disadvantages of the related art.

An object of the present invention is to provide a dual journaling storing method, in which data are divided into meta data and general file data. The file data is stored from a start location of a storage medium and the meta data is stored from an end location of the storage medium.

Additionally, in the dual journaling storing method of the present invention, the meta data is stored in the storage medium from a start location toward a rear portion, and the file data is stored from an end location toward a front portion.

Here, the dual journaling storing method can be applied to other data and other first and second kinds/characteristics of data, in addition to the meta data and the file data.

The data of the same kind are stored from start locations of respective partitions in a flash memory device and the data of the different kinds are stored from end locations toward the front portion.

The data stored from the start locations will be referred to as "front journaling" data, and the data stored from the end locations will be referred to as "rear journaling" data.

A location where the storage occurs will be referred to as "head", and a location where an erase operation is carried out at a rear portion of the journaling will be referred to as "tail". In other words, a head and tail of the front journaling data and a head and tail of the rear journaling data exist. Additionally, due to an increase of heads on both sides of the front and rear portions, the front and rear portions meet each other. Here, the location where the front and rear portions meet each other will be referred to as "central location".

If the data to be stored enters a file system of the respective partitions in the flash memory device, the storage medium needs a space for physically storing data and a space for storing meta data, such as the file entry and inode, which are necessary for creating the file data.

In this case, the file data and the meta data can be stored in the front journaling and the rear journaling, respectively. In other words, the file data and the meta data are respectively stored from the front portion and rear portion of the storage medium, and vice versa.

According to the dual journaling storing method of the present invention, when it is intended to store an arbitrary data in the storage medium, the store operation is carried out after determining in which portion the data will be stored. In case the data is updated, the previous data is invalidated and new data is stored in a location of the head. In case the data is erased, the invalidation is only marked to the data.

If the storage and update are repeated in this manner, the front journaling and the rear journaling meet each other, so that the central location is determined. In case both the front portion and the rear portion return to their initial location and data continue to be processed, one of them arrives first at the central location. At this time and subsequent times, it can be determined that the journaling arriving first at the central location C has a large amount of data to be stored. Therefore, the central location C moves toward the other party in order to increase the space for the journaling having a large amount of data.

In case of the flash memory, an object of the journaling storing method is to properly assign the number of erase times with respect to the erase block. If the central location moves, the journaling having a large amount of data is increased. As a result, it is possible to properly assign the number of erase times with respect to the front and rear portions.

Additionally, the flash memory device according to the present invention includes a processor for generating read and write commands for reading/write data from/to a specific address of a RAM, a flash memory for providing a data storage space, and a memory controller for controlling the data to be stored in the memory by using the herein described dual journaling storing method.

Further, according to the dual journaling storing method of the present invention, the flash memory device allowing the read operation during the write operation includes a plurality of partitions. The respective partitions can perform the read, write and erase operations together with other partitions (e.g., independently). The data stored in the respective partitions of the flash memory are divided into the meta data and the general file data. The file data is stored from the start location of the storage medium, that is, the respective partitions. Meanwhile, the meta data is stored from the end location of the respective partitions toward the start location.

A flash memory device according to the present invention includes: a multiple-partitioned memory; a plurality of partitions provided by a multiple partition of the memory, in which data being stored are independently read, written or erased; a charge pump for providing a plurality of voltage levels necessary to read, write and erase the data; and a plurality of first sense amplifiers configured for a read operation, in which the read operation is simultaneously executable for the respective partitions; a plurality of second sense amplifiers including at least one sense amplifier configured for erase and write operations, in which the erase and write operations are simultaneously executable for the respective partitions and the data are stored in the respective partitions from start and end locations of storage spaces of the respective partitions toward respective central portions.

The data stored in the respective partitions are stored from the start and end locations of the storage space toward the central portion.

Further, a mobile terminal according to the present invention includes the multiple-partitioned flash memory device, a plurality of buses, and a processor connected to the buses. At this time, the multiple-partitioned flash memory is connected to the bus and can be accessed by the processor.

Furthermore, a mobile terminal according to the present invention includes a storage device such as the flash memory or a hard disk drive (HDD), a plurality of buses, and a processor connected to the buses. At this time, the storage device is connected to the buses and can be accessed by the processor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings:

FIG. 2 exemplarily illustrates a center location that is determined when a head of a front journaling data and a head of a rear journaling data meet with each other in a dual journaling storing method according to an embodiment of the present invention;

FIG. 3 exemplarily illustrates a process of determining a new central location in the dual journaling storing method according to the present invention, in which a new central location is determined by moving the central location toward the rear journaling, when the head of the rear journaling arrives first at the central location after the central location is determined;

BEST MODE FOR CARRYING OUT THE INVENTION

Figure 1:
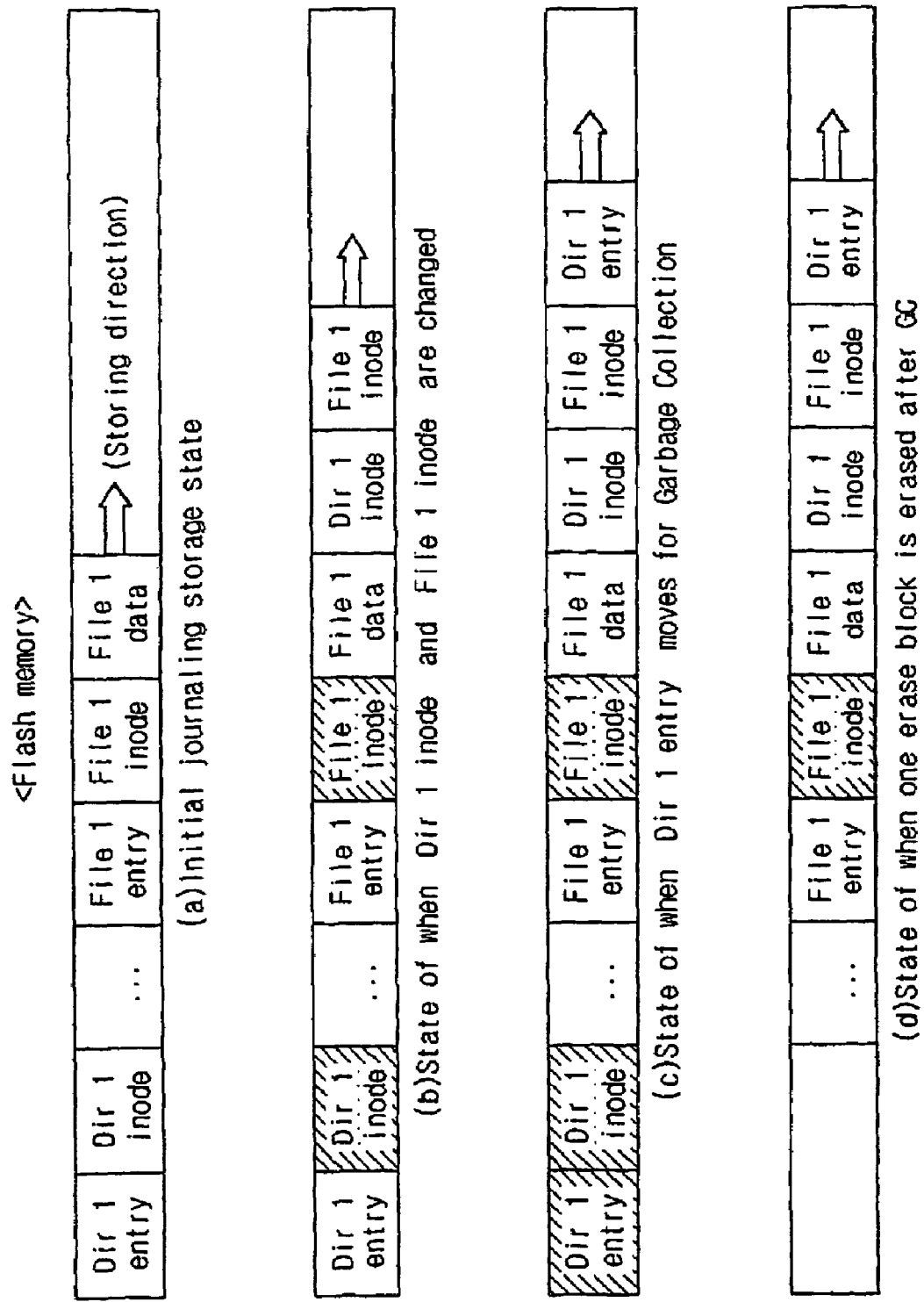
FIG. 1 is an exemplary view of a storing method in a JFFS2 configuring a file system into a flash memory.

Hereinafter, preferred embodiments of the present invention will be described in detail with reference to accompanying drawings.

FIG. 2 exemplarily illustrates a center location that is determined when a head of a front journaling data and a head of a rear journaling data meet with each other in a dual journaling storing method according to an embodiment of the present invention.

In FIG. 2(a), reference symbols "H1" and "T1" denote a head and a tail of a front journaling data, respectively. Reference symbols "H2" and "T2" denote a head and a tail of a rear journaling data, respectively. A reference symbol "C" denotes a central location.

If data Data1 enters a file system in respective partitions, it is determined whether the kind of data is the front journaling data or the rear journaling data, and its result is then stored in the heads.

Referring to FIG. 2(a), since the data Data1 is the front journaling data, the data Data1 is stored from a start location of the storage medium.

FIG. 2(b) illustrates a state when six data are stored. Four data Data1 to Data4 are the front journaling data and two data Data5 and Data6 are the rear journaling data.

The data Data2 and Data6 are erased. At this time, the data may not be erased actually due to a characteristic of the journaling storing method but represented with invalid states.

FIG. 2(c) illustrates a state when a garbage collection (GC) is carried out for lack of the storage space in the storage medium. In other words, since the data Data1 is a valid data, the data Data1 moves to the head and the previous data Data1 is then invalidated. If size of the data Data1 and the previously invalidated data Data2 exceeds the erase block size, an erase operation is actually carried out to thereby secure a free space.

In case of the flash memory, the erase operation is actually carried out. Meanwhile, in case of the disk, it is unnecessary to separately carry out the erase operation.

If the free space is secured, the tail T1 corresponding to the end portion of the front journaling moves to a location of the data Data3. In the same manner, if the data Data6 is invalidated and erased after the data Data6 becomes the erase block size, the tail T2 of the rear journaling also moves.

In this state, it is intended to store a new data Data7. Although it is intended to store the data Data7 in the front head H1 as the front journaling data, the space is lacking.

Therefore, as shown in FIG. 2(d), only a data D7-1 is stored. Here, the data D7-1 corresponds to a portion which can be stored. Then, the front head H1 returns to the start location and the remaining data D7-2 is stored.

In this manner, if the front journaling meets the rear journaling, it returns to the start location and is then stored. The location where the front head H1 and the rear head H2 meet each other is set as the central location C. At this time, the rear head H2 also returns to the end location and waits for a storage. In other words, in this manner, data are stored in the front and rear journalings and the central location is set.

When data continue to be stored in this manner, one of the front and rear heads H1 and H2 arrives first at the central location C. In this case, it can be determined that the journaling arriving first at the central location C has a large amount of data to be stored.

Therefore, the central location C moves toward the is other party in order to increase the space for the journaling that arrives first at the central location.

FIG. 3 exemplarily illustrates a process of determining a new central location in the dual journaling storing method according to the present invention. In FIG. 3, after the central location is determined, in case the head of the rear journaling arrives first at the central location, a new central location is determined by moving the central location toward the front journaling.

Referring to FIG. 3(a), data Data3 and Data5 are invalidated and the rear journaling data are stored actively, so that data Data8 and Data9 are stored. Although it is intended to store data Data10, a storage space is lacking.

In other words, this is a case the rear journaling arrives first at the central location C. Here, since the rear head H2 does not meet the front head H1, the central location C moves toward the front portion as long as a sufficient data storage space exists in the front portion.

The process of determining whether or not enough data exist in the front portion is carried out in a garbage collection of FIG. 5, which will be described later.

For the purpose of this process, the front data D7-1 moves to the front head H1 and the central location C also moves toward the front portion, as shown in FIG. 3(b).

At this time, in case of the flash memory, unit of data moving toward the front portion is an erase block unit.

The reason is that a new data cannot be stored until a free space is created by carrying out a clear operation after the movement.

Here, the erase block means a memory unit that can be erased at a time in the flash memory. In general, the memory unit is 128 Kbytes or 256 Kbytes. At this time, if a cleaning operation is carried out to the erase block, a free block is created. Here, the "free block" is a space where data can be stored and the "free space" means a free block with a predetermined size.

After such a free space is created, a new data Data10 is stored.

The central location C moves until it meets the front head H1 or until the data storage space sufficiently exists in the front portion.

Figure 4:
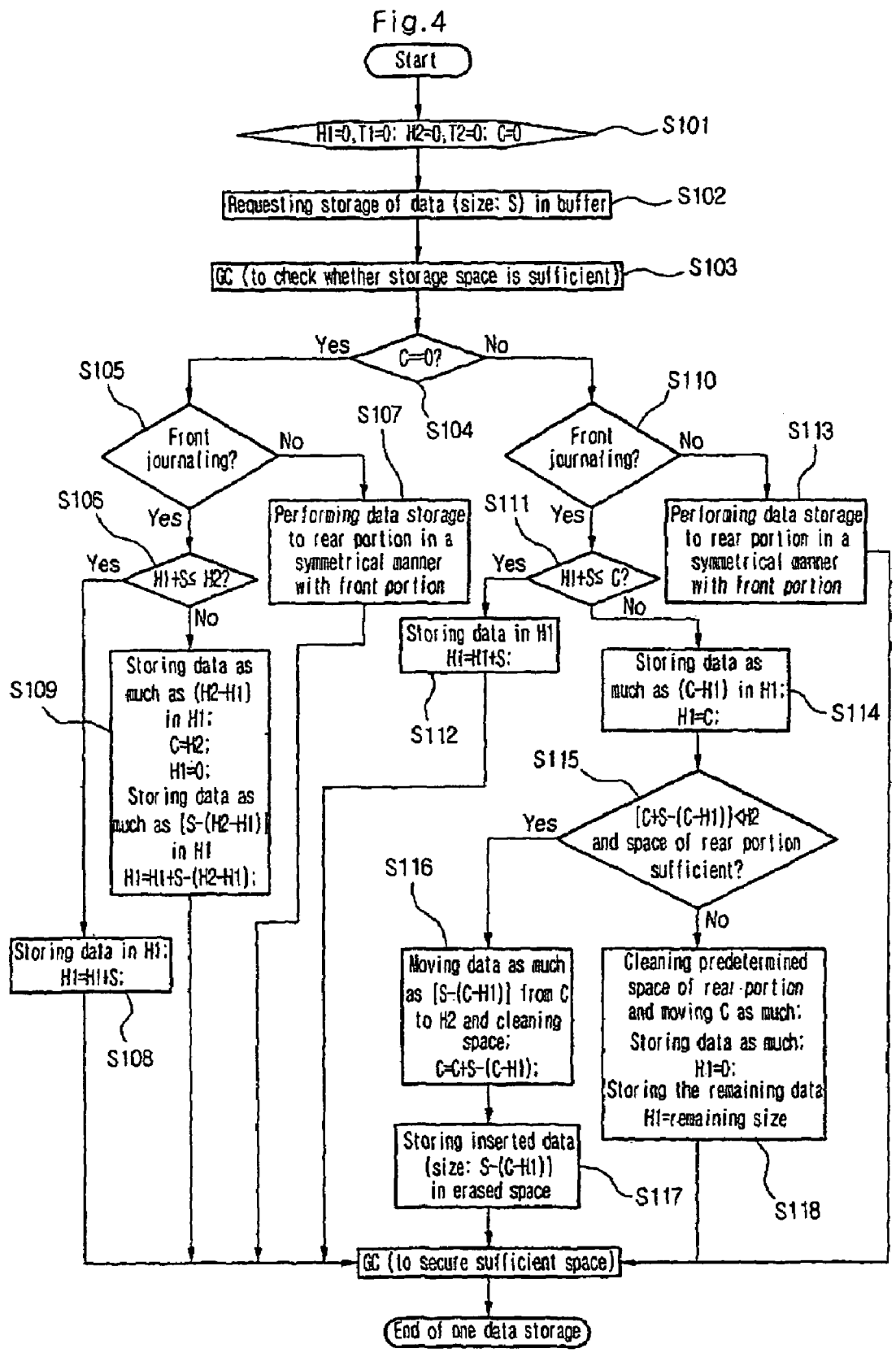
FIG. 4 is a flowchart illustrating a dual journaling storing method according to an embodiment of the present invention.

FIG. 4 is a flowchart illustrating a dual journaling storing method according to the present invention.

In other words, FIG. 4 illustrates the flowchart of the dual journaling storing methods such as described in FIGS. 2 and 3, in which the method includes the process of storing the data, the process of determining the central location, and the process of moving the central location.

Referring to FIGS. 2 to 4, initial values of the front head H1, the rear head H2, the front tail T1, the rear tail T2 and the central location C are basically set to zero (S101). These are the initial states when the front journaling data and the rear journaling data are stored.

The data storage is requested to the file system through a buffer. If the data storage is requested to the storage medium in this state (S102), it is checked whether or not the storage space is sufficient by the garbage collection (EC), which will be described later with reference to FIG. 5 (S103).

If it is determined that the storage space of the storage medium is sufficient, the process returns directly to the flowchart of FIG. 4. Meanwhile, if it is determined that the storage space of the storage medium is insufficient, the process returns to the flowchart of FIG. 4 after the storage space is secured.

Then, it is checked whether or not the central location C is zero (S104). This process is carried out for checking whether or not the central location is determined for the first time. The reason is that the process in the initial state before the central location C is determined is different from the process in a state after the central location C is determined.

In other words, in case the central location C is determined at the first time, it must be checked-whether the head of one side meets the head of the other side. Meanwhile, in case the central location C has been already determined, it must be checked which head first meets the central location C.

According to the checking result of the step S104, in case the central location C is zero or not zero, it is respectively checked whether or not the data is the front journaling data (S105). Then, the data is stored according to the respective cases.

It is assumed that the central location C is zero, the new stored data is the front journaling data, that is, the data is being stored from the front portion of the storage medium, and its size is S.

In this case, if the data is stored, it means that a head of the front journaling data is newly located at "H1+S". First, the step 9106 is carried out for checking whether or not there is a space enough to store the data whose size is "S".

If the head H1+S of the stored front journaling data does not meet with a head H2 of the rear journaling data, that is, if (H1+S)≦H2, it means that the storage space is sufficient. Therefore, the front journaling data is stored from the location H1, so that the head of the data increases from the previous location H1 to the location H1+S (S108). This corresponds to the contents described in FIGS. 2(a) and 2(b). Here, the locations H1 and H2 are addresses that increase, for example, by byte unit in the flash memory and the data size S is a byte unit, so that they can be correspondingly operated using an equal unit.

Meanwhile, if (H1+S)≦H2 is not satisfied, that is, if the head H1+S of the front journaling data meets with the head H2 of the rear journaling data, only a storable size (H2−H1) among the data size S is stored from the location H1 (S109).

Additionally, in this case, the location H2 is determined as the central location like FIG. 2(d), and the remaining portion [S−(H2−H1)] of the data is stored from the start location of the front journaling.

In other words, as shown in the step S109, the central location C is not zero any more, H1 becomes zero, the remaining portion [S−(H2−H1)] of: the data is stored from zero, and H1 increases as much as [S−(H2−H1)]. This corresponds to the contents described in FIGS. 2(c) and 2(d). In other words, H1 in FIG. 2(d) corresponds to [S−(H2−H1)] and becomes a new storage location.

If the data being stored is the rear journaling data, the data is stored in a manner that is symmetrical (e.g., S106, S108, S109) with the above description (S107).

Additionally, in the step S104, if the central location C is not zero, it is checked whether or not the data being stored is the front journaling data (S110).

When the central location C is not zero, the head of the front journaling data and the head of the rear journaling data have already met each other so that the central location has been determined. Therefore, in case the data being stored is the front journaling data, it must be checked whether or not the head (H1+S) exceeds the central location C. This is different from the above description.

At this time, if the head H1+S of the front journaling data does not exceed the central location C, that is, (H1+S)≦C, it means that the storage space is sufficient (S111). Therefore, the front journaling data is stored from the location H1, so that the head of the data increases from the previous location H1 to the location H1+S (S112).

Meanwhile, if (H1+S)≦C is not satisfied, that is, if to the head H1+S of the front journaling data meets with the central location C, only a storable size (C−H1) among the data size S is stored from the location H1 (S114).

This step is carried out in order to secure the sufficient space when it is determined that there is a large quantity of the front journaling data. Through this step, the storing times in the flash memory can be assigned properly.

However, if the central location C moves toward the rear portion, a valid data of the rear journaling data moves to the location H2. At this time, it must be checked whether or not there is a storable space in the rear portion (S115). In other words, it is checked whether or not there is a storage space where the remaining portion [S−(C−H1)] of S can be stored. This corresponds to the contents described in FIG. 3(b).

If there is the storable space in the rear portion, data as much as [S−(C−H1)] moves to the location H2 (S116) and a new data [S−(C−H1)] is stored in that location. It can be understood through the movement of D7-1 to the location H1 in FIG. 3(b). Although FIG. 3 illustrates the case that the central location moves toward the front portion, its principle is equal to that described above.

Meanwhile, if there is no storable space in the rear portion, it means that the rear portion is filled with data. Therefore, the central location moves toward the rear portion as much as the storable portion. The remaining portion returns to the position "0" (that is, H1=0) and is then stored (S118).

If the data being stored is the rear journaling data, it is stored in a manner that is symmetrical (e.g., corresponding to S111, S112, S114-S118) with the above description (S113).

If the process of storing the data is ended, the garbage collection (GC) process is carried out.

Figure 5:
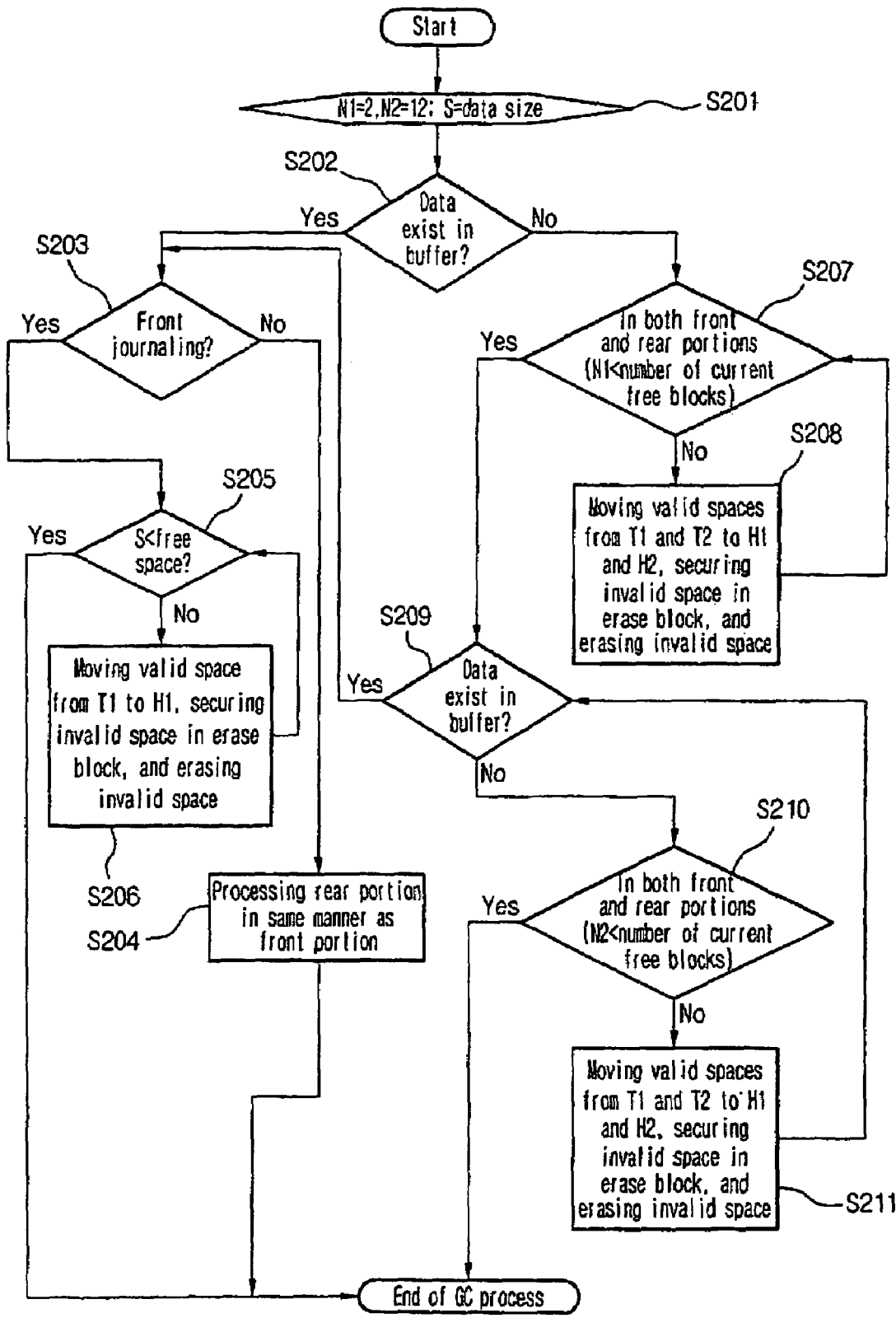
FIG. 5 is a flowchart of the garbage collection (GC) process as a portion of the dual journaling storing method.

FIG. 5 is a flowchart of the garbage collection (GC) process as a portion of the dual journaling storing method.

Referring to FIG. 5, if the data storage is requested, the garbage collection (GC) process is carried out to check whether or not there is the free space where the data can be stored.

The data to be stored exists in the storage buffer for the moment. If there is no free space as much as a data size to be stored, the data moves using the journaling method and the cleaning operation is carried out after the invalid space is collected as much as the erase block. Then, if the minimum space for the new data is secured, the storing process is first carried out. Till now, a first portion GC process is called in FIG. 4 (S101 to S103).

It is checked whether or not there are the data in the buffer in a state that the free block for a predetermined data size exists (S202). If there are the data in the buffer, it is checked whether all data are the front journaling data (S203).

At this time, the free block is formed after the cleaning process is carried out to the erase block, and it means the space where the data can be stored. Additionally, the free block with a predetermined size forms the free space.

In the step S203, in case the data is not the front journaling data, the rear portion is processed using the same manner as the front portion (S204). On the contrary, in case the data is the front journaling data, it is checked whether or not the free space is sufficient (S205).

If the free space is sufficient, the garbage collection (GC) process is ended. On the contrary, if the free space is insufficient, the valid space moves from the front tail T1 to the front head H1. Thereafter, the invalid space is secured in the erase block and then erased (S206).

Meanwhile, after storing an inserted data, the GC process is again called in order to secure the sufficient space within the storage space. At this time, the number of the erase blocks to be cleaned is determined using the decision graph of FIG. 6. This is carried out when there is no data to be stored in the storage buffer.

Figure 6:
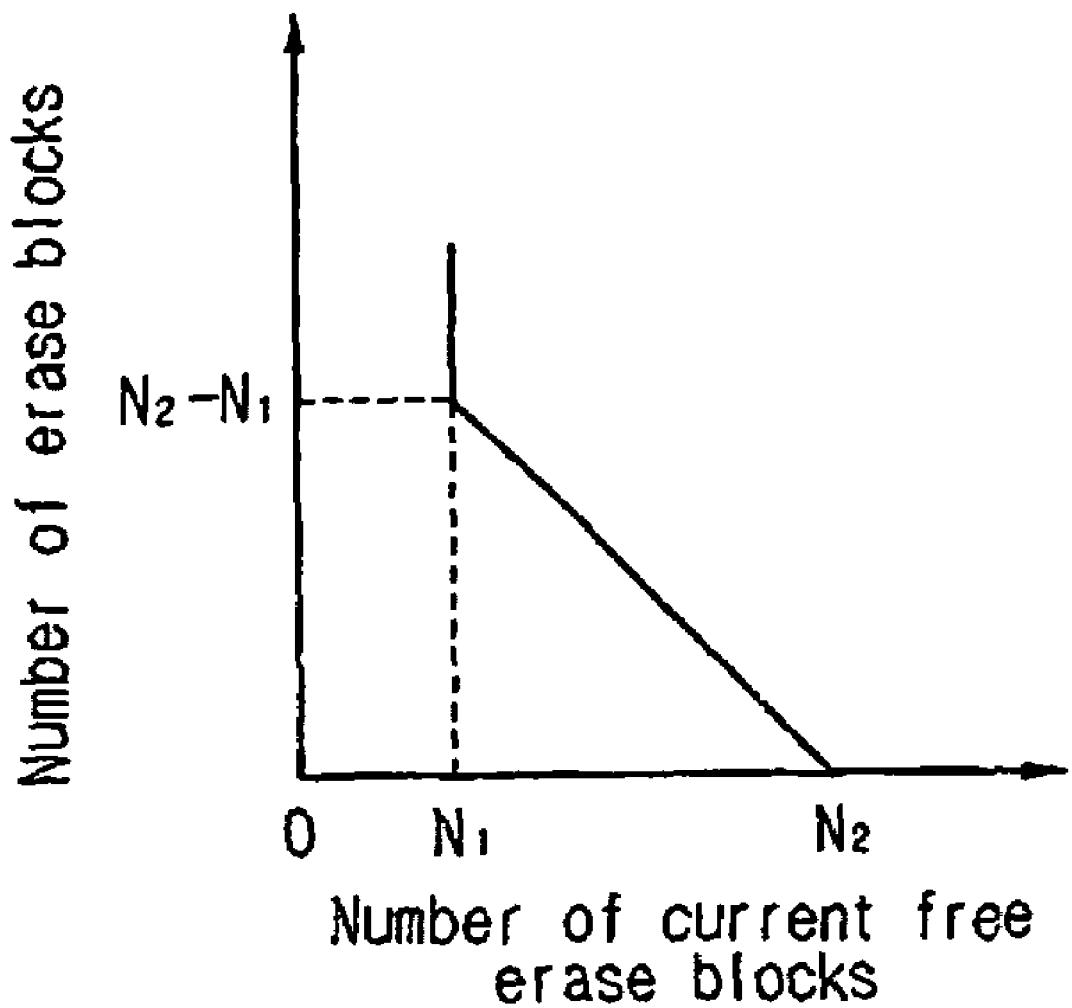
FIG. 6 is a graph for determining the number of erase blocks in the garbage collection (GC) process of the dual journaling storing method.

In this state, as shown in FIG. 6, if $N_2$ or more free blocks are secured in the decision graph, the cleaning operation is no longer carried out to the erase block. The value "$N_2$" is generally set to about 10% of the entire storage space. In case the number of the current free block is between $N_1$ and $N_2$, a predetermined number of the erase blocks are cleaned in order to secure $N_2$ or more free blocks to the maximum (S207, S208, S210 and S211).

At this time, the value $N_1$ means a threshold value in which the free block is exhausted and can be set to 2 or 3 according to its setup. In other words, in case only two or three free blocks remain in the current system, the system preferentially moves the valid data to other free block among the erase blocks where the invalid data and the valid data are mixed. Accordingly, if the erase block becomes the invalid block, the free space is secured by carrying out the cleaning process.

Additionally, the value $N_2$ is set to about 10% of the number of the erase blocks in the entire flash memory.

Since the time taken to clean the erase blocks of the flash memory is 2 to 10 times longer than the data store time and 100 to 1000 times longer than the data read time, the is cleaning process is frequently carried out, resulting in a problem that the system becomes slow as a whole.

Accordingly, when the space of the flash memory is considered sufficient, the cleaning process is not carried out. A degree to which the free space of the flash memory is considered sufficient is generally about 10%. In the step S207, if the number of the current free blocks is equal to or less than $N_1$, the erase block is preferentially secured over all operations. If the number of the free erase blocks is equal to or less than N, even after the erase operation, it means that there is not the storage space any more.

Additionally, in the step S210, if the number of the current free blocks is equal to or less than $N_2$, the invalid space is secured in the erase block and then cleaned (S210, S211).

The reason why the sufficient free space is not secured from the initial garbage collection (GC) is because a latency time becomes long in order to secure the sufficient free space when the request for the data storage is received, while the cleaning operation needs a longer time period than a read or write operation.

Further, in case the request for the read and write operations is received while the cleaning operation is carried out, most of the flash memories can function to suspend the cleaning operating and perform high-priority operations. Therefore, this function can be utilized.

Although the dual journaling storing method of the present invention described with reference to FIGS. 2 to 6 is applicable to various storage media, exemplary flash storage medium applicable to the dual journaling storing method will be described below.

Figure 7:
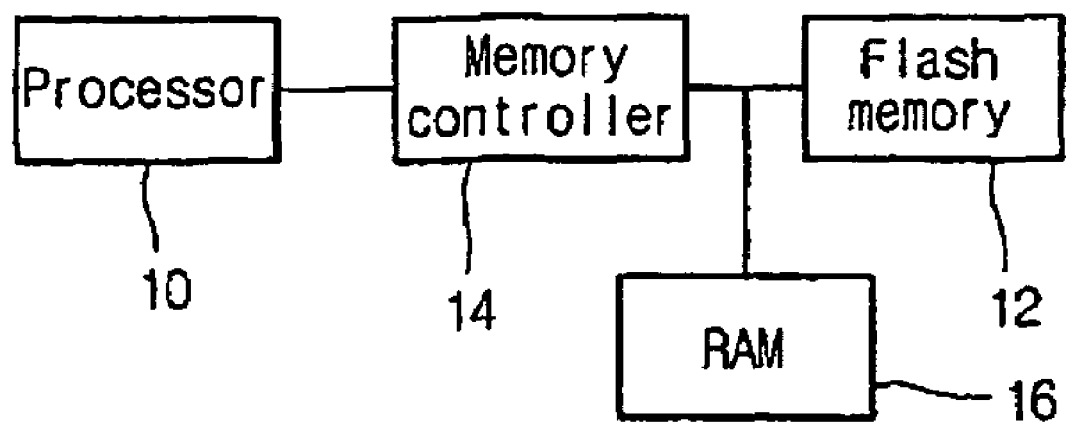
FIG. 7 is a schematic block diagram of a flash memory applicable in the dual journaling storing method according to an embodiment of the present invention.

FIG. 7 is a schematic block diagram of the flash memory applicable in the dual journaling storing method according to an embodiment of the present invention.

Referring to FIG. 7, the flash memory device according to the present invention includes a processor 10 for generating read and write commands for reading/write data from/to a specific address of a RAM 16, a flash memory 12 for providing a data storage space, and a memory controller 14 for controlling the data to be stored in the memory 12 according to the dual journaling storing method of the present invention.

Figure 8:
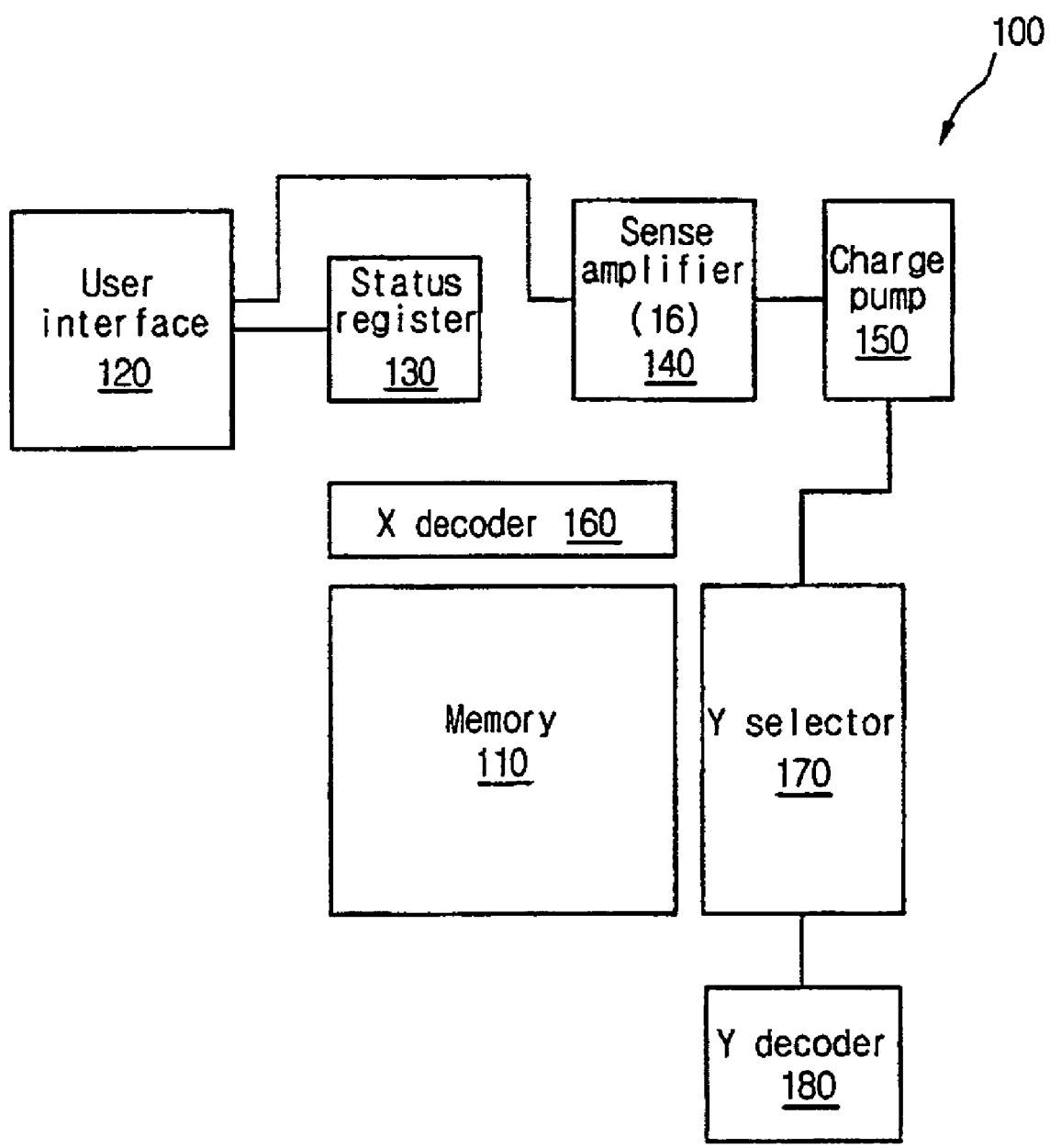
FIG. 8 is a block diagram of a flash memory device according to an embodiment of the present invention.

FIG. 8 is a block diagram of the flash memory device according to an embodiment of the present invention. In this case, the data stored in the memory 110 of the flash memory device is stored according to the dual journaling storing method, as described in FIGS. 2 to 6.

Referring to FIG. 8, the flash memory device 100 according to an embodiment of the present invention includes a memory 110 for storing data, an X-decoder 160, a Y-selector 170 and a Y-decoder 180. The X-decoder 160 and the Y-decoder 180 assigns addresses to rows and columns of the memory.

Additionally, a user interface 120 controls the flash memory device 100. The user interface 120 is connected to a processor for controlling an access to the memory 110, and a status register 130 stores a state of the memory 110 (e.g., a write state, a read state or an erase state). The processor acquires the state of the flash memory from the user interface 120.

Further, sense amplifiers 140 are connected to the memory 110 to amplify signals for the read or write operation from or to the memory 110. For example, in case there are columns with sixteen I/Os, sixteen sense amplifiers 140 are used for the sixteen I/Os one by one.

Furthermore, the flash memory 100 further includes a charge pump 150. The charge pump 150 is used to provide voltage levels necessary for the write, read and erase operations of the memory 110.

The flash memory device of the present invention is configured with one memory subset and performs the read or write operation by one block. Accordingly, the flash memory has a disadvantage in that the user cannot write data to a block simultaneously while erasing or reading other block of the memory.

However, a simultaneous operation is demanded in several application technologies limited by the erase time (generally, 250 to 500 ms) of the flash memory block. For example, a mobile telephone directly executes codes from the flash memory. It has an advantage in that the memory block divided for utilizing the data storage space can be erased.

Herein, the flash memory device capable of solving the problem and applicable to the dual journaling storing method of the present invention will be described below with reference to FIG. 9.

Figure 9:
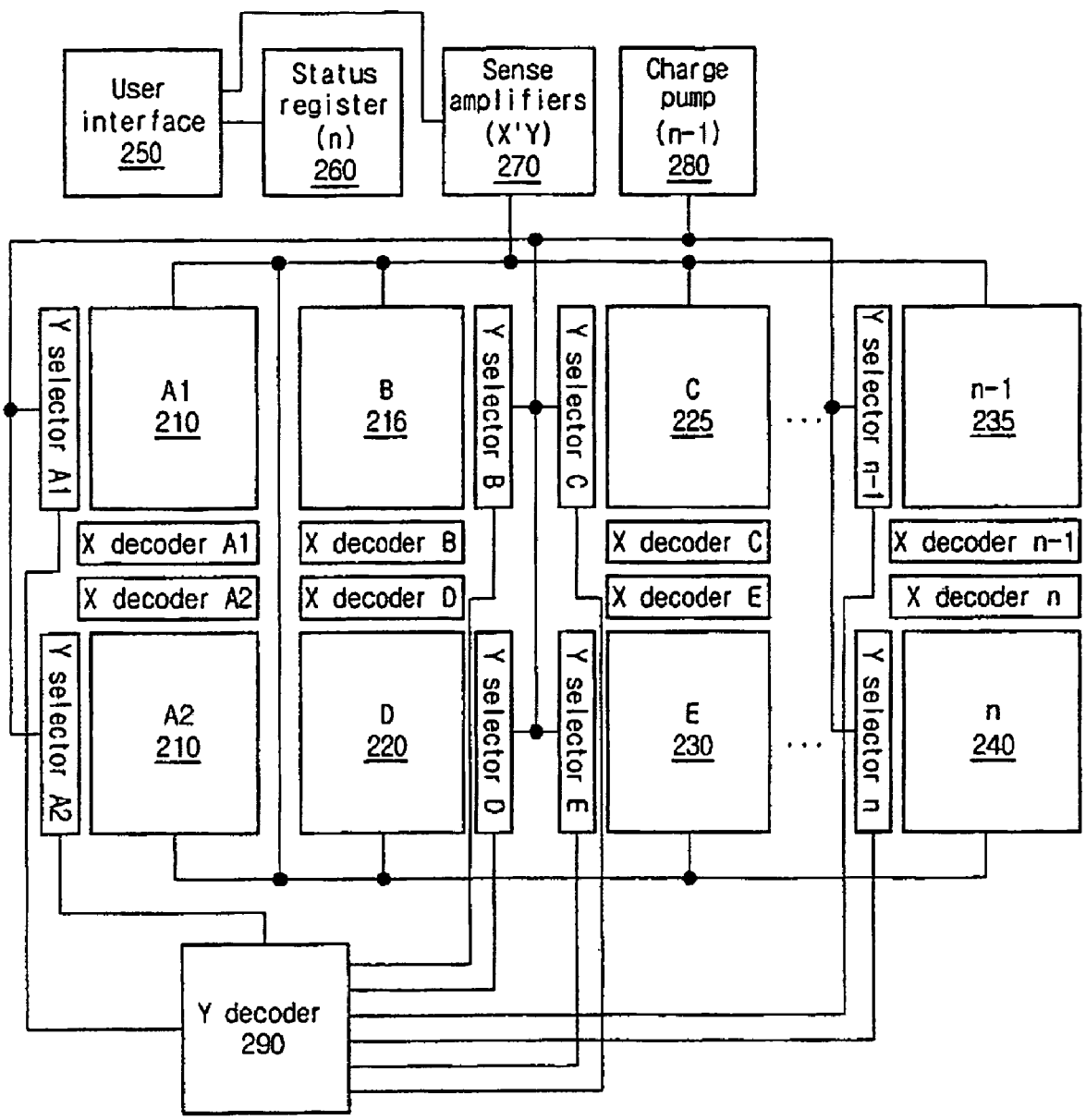
FIG. 9 illustrates a multiple-partitioned flash memory device according to an embodiment of the present invention.

FIG. 9 illustrates a multiple-partitioned flash memory device according to an embodiment of the present invention.

In FIG. 9, partitions A 210, B 216, C 225, D 220, E 230, . . . , n–1 235, n 240.

Each of the partitions is provided with a unit that is physically partitioned in the flash memory device. In one embodiment, each of the partitions is provided on a different physical layer. The respective partitions 210, 216, 220, 225, 230, 235 and 240 are connected with both an X decoder and a Y decoder.

Each of Y selectors is connected to the Y decoder 290 for controlling them. In another embodiment, a plurality of Y decoders 290 can exist inside the system.

The X decoder and the Y decoder enable a selection of a specific region within the flash memory for the purpose of the access including the read, write and erase operation. Through the plurality of X selectors and the plurality of Y selectors, it is possible to perform an access to one or more subsections of the flash memory.

For example, the operation of writing data to the partition B and the operation of reading data from the partition C are carried out at the same time while the partition A is being erased. Each of the partitions can include one or more blocks that can be erased separately. Accordingly, for example, it is possible to write data to the memory of the partition A while the memory block of the partition B is being erased.

The user can control the access to the flash memory 200 through the user interface 250. In one embodiment, the user interface 250 can be a portion of the flash memory itself. In another embodiment, the user interface 250 can be disposed at a separate chip. The interface includes a plurality of state machines for controlling respective parallel write operations.

Accordingly, in case two parallel write operations (for example, an operation of writing data to a data block while the codes are updated) are carried out, two state machines are provided. If three parallel write operations are carried out, three state machines are provided.

The status registers 260 are connected to the user interface 250. The status registers 260 indicate a state of each partition. In one embodiment, if there is the n number of partitions, the n number of the status registers 260 is provided. The state of each partition is any one of "idle", "being read", "being written" and "being erased".

Additionally, the sense amplifiers 270 are connected to the user interface 250. The sense amplifiers are used for the read, write and erase operations.

In one embodiment, the number of the sense amplifiers 270 is determined like a following manner. In other words, in a 16-bit wide flash memory, sixteen sense amplifiers 270 are necessary for the respective executable parallel operations. For example, in case the first partition is read while the second partition is being written, thirty-two sense amplifiers 270 are necessary.

Additionally, in case two partitions are read in parallel, thirty-two sense amplifiers 270 are necessary for the read operation. The number of the sense amplifiers 270 is a factor of a product of an output column width (X) of the flash memory and the number (Y) of the executable parallel operations.

In one embodiment, in case of a triple-partitioned flash memory, the first, second and third partitions may be read, written and erased, respectively. In this case, 3X sense amplifiers are used. The sense amplifiers 270 used for the erase operation uses a very low ratio in a total erase time.

In a similar manner, the sense amplifiers 270 used for the write operation use a low ratio in a total write time. Accordingly, in one embodiment, one sense amplifier 270 is used for both the respectively executable parallel write operations and the respectively executable parallel erase operations.

In case the respective bits are written, the sense amplifier 270 is used to verify the respective bits. Additionally, redundant sense amplifiers 270 can be provided for other operations such as a redundant column access.

In one embodiment, two redundant sense amplifiers 270 are provided within the sense amplifier block 270 in the respective parallel write operation and/or read operations.

Further, the charge pumps 280 are included in the circuit. The charge pumps 280 are used to adjust the voltage levels for the read, write and erase operations. In one embodiment, the voltage level necessary for the erase operation is about –10 volts.

In one embodiment, the voltage level necessary for the read and write operations are about 7 volts. In one embodiment, one charge pump 280 having a plurality of lead lines is used to permit the parallel access to the partitions.

In another embodiment, a plurality of separate charge to pumps 280 can be used to provide the voltage level necessary to access the different partitions at the same time.

The charge pumps 280 are connected to the Y selectors of the respective partitions in order to increase the voltage level to levels adaptable for the read, write and erase operations.

If the flash memory is sectioned into multiple partitions, the respective partitions can perform independently the read, write and erase operations. Accordingly, data are also stored independently in the respectively partitions.

At this time, the present invention is characterized in that the data are stored in the respective partitions based on the dual journaling storing method described above with reference to FIGS. 2 to 6.

The described-above dual journaling storing method and the flash memory device to which the storing method is applied can be used for various purposes.

As one embodiments a mobile terminal to which the dual journaling method of FIGS. 2 to 6 and the multiple-partitioned flash memory device of FIG. 9 are applied will be described below.

Figure 10:
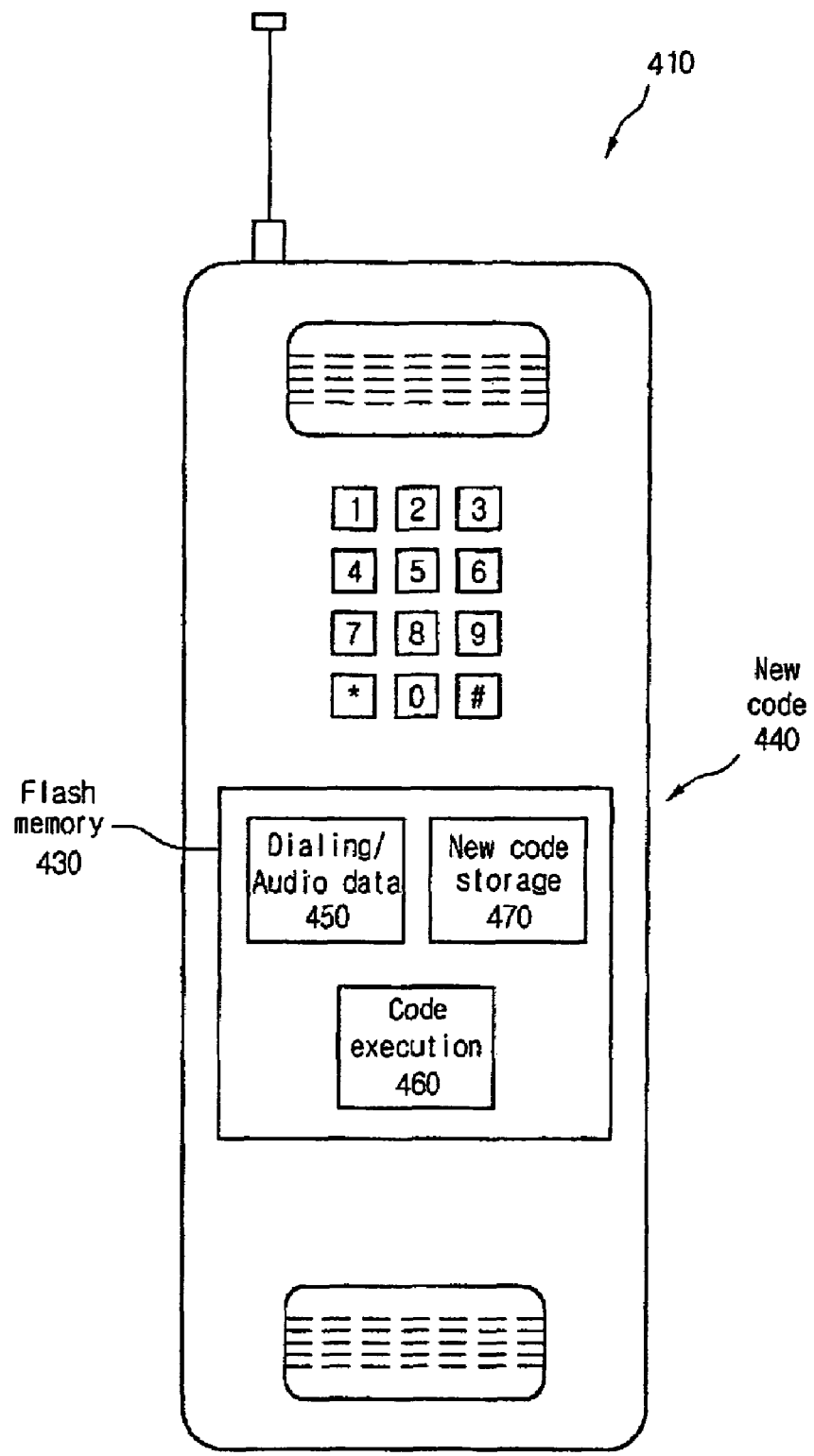
FIG. 10 illustrates an exemplary mobile terminal using the flash memory device according to the present invention.

Here, the number of the partitions of the multiple-partitioned flash memory device depends on the function of the flash memory. FIG. 10 illustrates an exemplary mobile terminal using the flash memory device according to the present invention.

Usage examples of the triple-partitioned flash memory device are as follows: (1) the partitions can be used to store data; (2) the partitions can be used to store codes that are executed by an apparatus contained in the flash memory device; and (3) the partitions can be used to permit the update of the codes.

For example, in case the codes are changed due to the update, a new code is written to the third partition at the same time while an original code stored in the second partition is executed.

If the new code is written and verified, the third partition is used for the code. Accordingly, a seamless update of the flash memory is possible.

In another embodiment of the triple-partitioned flash memory device, the code is executed from the first partition and the data update is executed in the second partition. As a result of the code execution, the seamless data update can be achieved.

FIG. 10 illustrates an example of a mobile terminal employing the flash memory device of the present invention.

Referring to FIG. 10, the mobile terminal 410 includes the flash memory device 430 according to an embodiment of the present invention.

Although the flash memory device 430 is drawn in the mobile terminal 410, it should be understood that the flash memory device 430 is generally installed in a receptacle of the mobile terminal's body.

Additionally, the mobile terminal includes various buses and a processor connected to the buses. The flash memory device 430 of the present invention is connected to is the buses and the processor can access the flash memory device 430.

The mobile terminal 410 is in operation and is executing the code, and the partition 460 including the current activated code is being executed.

The usage of these codes is well known in the field. Another partition 450 contains dialing or audio data. For example, the mobile terminal 410 can contain a dialing director or similar data in the data partition 450.

The third partition 470 receives a new code 440 from an exterior. As one example, the third partition can be updated remotely. Accordingly, while the mobile terminal is operating, the new code 440 can be written to the new code partition 470 and the data partition 450 can be used to reproduce the dialing data. At the same time, the code stored in the partition 460 can be executed.

In this manner, the mobile terminal permits the update of the seamless mobile telephone code, the simultaneous update, and the usage of the mobile terminal. Other application fields such as the seamless code update can be implemented similarly.

Additionally, the present invention is characterized in that the data can be stored in the respective partitions by the dual journaling storing method described and shown throughout the attached drawings.

INDUSTRIAL APPLICABILITY

According to the dual journaling storing method of an embodiment of the present invention, the data stored in the storage medium such as the flash memory are divided into the meta data and the general file data, and the file data are stored from the start locations of the storage medium, that is, the respective partitions. The meta data are stored from the end locations of the respective partitions toward the start locations.

In case the dual journaling storing method of embodiments of the present invention is used, data of the same kind is maintained in the predetermined area. Therefore, the fast data access time can be obtained and the erase times of the flash memory can be properly assigned to the space of the flash memory.

Further, according to the dual journaling storing method of the present invention, in case data error occurs due to the power error, it is easy to restore the data to the previous version, thereby securing the data reliability.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A dual journaling storing method for storing data in a storage medium, characterized in that data are stored from start and end locations of the storage medium toward a central location, wherein when two types of the data whose kind and characteristics are different are stored in the storage medium, the two types of data are separately stored as a front journaling and a rear journaling, respectively, wherein when a head of the front journaling and a head of the rear journaling meet each other at a first location, a central location is set at the first location and the head of the front journaling is returned to the start location and the head of the rear journaling is returned to the end location, wherein the central location moves toward the other party's journaling if the head of the front journaling or the head of the rear journaling arrives again at the central location and the other head is not located at the central location, and wherein the head is indicative of a location for storing data.

2. The dual journaling storing method according to claim 1, wherein when the front journaling and the rear journaling meet each other at the central location, data is again stored from the start location and the end location, respectively.

3. The dual journaling storing method according to claim 1, wherein a garbage collection is performed at the front journaling and the rear journaling independently.

4. A method for storing data in a storage medium, comprising:

dividing the data into a first data and a second data; and storing one of the first data and the second data from a start location of the storage medium, and storing the other from an end location of the storage medium toward the start location, wherein when a head of the first data and a head of the second data are stored and meet each other at a first location, a central location is set at the first location, and the first and the second data are stored from the start location and the end location, respectively, and wherein the central location is variably formed based on at least one of a respective amount of data to be stored or a size of a respective storage space in which the data is to be stored.

5. The method according to claim 4, further comprising: wherein the central location moves toward the other party's data if a head of the first data or a head of the second data arrives again at the central location and the other head is not located at the central location, and wherein the head is indicative of a location for storing data.

6. The method according to claim 4, wherein the first data is meta data and the second data is file data.

7. The method according to claim 5, wherein a number of erasures of the storage medium is reduced by said moving the central location for each subsequent time.

8. A flash memory device, comprising:
a processor that generates a read/write command for reading/writing data from/to a specific address;
a flash memory that provides a data storage space; and
a memory controller that controls the data to be stored in the flash memory from start and end locations of the data storage space toward a central location, wherein when data whose characteristics are different are stored in the flash memory, the data are separately stored as a front journaling and a rear journaling, wherein when a head of the front journaling and a head of the rear journaling meet each other at a first location, a central location is set at the first location and the head of the front journaling is returned to the start location and the head of the rear journaling is returned to the end location, wherein the central location moves towards the other party's journaling if the head of the front journaling or the head of the rear journaling arrives again at the central location and the other head is not located at the central location, and wherein the head is indicative of a location for storing data.

9. The flash memory device according to claim 8, wherein a garbage collection is performed at the front journaling and the rear journaling independently.

10. A multiple-partitioned flash memory device, comprising:
a memory;
a plurality of partitions provided by a multiple partition of the memory, in which data being stored are independently read, written, or erased;
a charge pump that provides a plurality of voltage levels necessary to read, write, and erase the data;
a plurality of first sense amplifiers configured for a read operation, the read operation being simultaneously executable for the respective partitions; and
a plurality of second sense amplifiers including at least one sense amplifier configured for erase and write operations, the erase and write operations being simultaneously executable for the respective partitions, wherein the data are stored in the respective partitions from start and end locations of storage spaces of the respective partitions toward respective central locations, wherein the central locations are variably formed based on at least one of a respective amount of the data to be stored or a size of a respective storage space in which the data is to be stored in the respective partitions, wherein when data whose characteristics are different are stored in each partition of the memory, the data are separately stored as a front journaling and a rear journaling, wherein when a head of the front journaling and a head of the rear journaling meet each other at a first location, a central location is set at the first location and the head of the front journaling is returned to the start location and the head of the rear journaling is returned to the end location, wherein the central location moves toward the other party's journaling if the head of the front journaling or the head of the rear journaling arrives again at the central location and the other head is not located at the central location, and wherein the head is indicative of a location for storing data.

11. The multiple-partitioned flash memory device according to claim 10, wherein in a case that the front journaling and the rear journaling meet each other at the central location, the data is again stored from the start location.

12. The multiple-partitioned flash memory device according to claim 10, wherein the data being stored in the respective partitions are divided into a meta data and a file data, the file data being stored from the start locations of the respective partitions, the meta data being stored from the end locations of the respective partitions toward the start locations.

13. A dual journaling storing method for storing data in a memory sectioned into multiple partitions, data being independently read, written, or erased according to the respective partitions, characterized in that the data is stored from start and end locations of storage spaces of the respective partitions toward a central location, wherein a garbage collection is performed at the front journaling and the rear journaling independently when a free space insufficient.

14. The dual journaling storing method according to claim 13, wherein in a case that the front journaling and the rear journaling meet each other at the central location, the data is again stored from the start location and the end location, respectively.

15. The dual journaling storing method according to claim 13, wherein when a head of the front journaling and a head of the rear journaling meet each other at a first location, a central location is set at the first location and the head of the front journaling is returned to the start location and the head of the rear journaling is returned to the end location, wherein the central location moves toward the other party's journaling if the head of the front journaling or the head of the rear journaling arrives again at the central location and the other head is not located at the central location, and wherein the head is indicative of a location for storing data.

16. The dual journaling storing method according to claim 13, wherein in a case that data having different characteristics is stored in the memory, the data are separately stored as a front journaling and a rear journaling.

17. The dual journaling storing method according to claim 16, wherein the data being stored in the respective partitions are divided into a meta data and a file data, the file data being stored from the start locations of the respective partitions, the meta data being stored from the end locations of the respective partitions toward the start locations.

18. A dual journaling storing method for storing data in a memory sectioned into multiple partitions in a case that the data are inserted into the respective partitions of a flash memory, wherein the data are independently read, written, or erased according to the respective partitions, the dual journaling storing method comprising:
when the insertion of the data into the respective partitions is requested, a storage medium performing a garbage collection if a storage space is insufficient, thereby moving the data and carrying out an erase operation; and checking whether there is a sufficient space in the storage medium after the data storage is completed, thereby securing a storage space for a next inserted data, wherein when the erase operation is carried out, the free storage space is secured and a valid data of the data moves to a head location of the respective partitions, wherein when data whose characteristics are different are stored in each partition of the memory, the data are separately stored as a front journaling and a rear journaling, wherein when a head of the front journaling and a head of the rear journaling meet each other at a fast location, a central location is set at the first location and the head of the front journaling is returned to the start location and the head of the rear journaling is returned to the end location, wherein the central location moves toward the other party's journaling if the head of the front journaling or the head of the rear journaling arrives again at the central location and the other head is not located at the central location, and wherein the head is indicative of a location for storing data.

19. The method according to claim 18, wherein when the erase operation is carried out, the free storage space is secured and a tail corresponding to an end location of at least one of a front journaling data or a rear journaling data of the respective partitions moves to a central location of the storage space of the storage medium, wherein the tail is indicative of a location for starting to erase data.

20. The method according to claim 18, wherein when the erase operation is carried out, the free storage space is secured and a valid data of the data moves to a head location of at least one of a front journaling data or a rear journaling data of the respective partitions.

21. The method according to claim 20, wherein the central location is variably formed based on at least one of a respective amount of data to be stored or a size of a respective storage space in which the data is to be stored from the start and end locations of the storage medium.

22. The dual journaling storing method according to claim 3, wherein the garbage collection is performed when a free space is insufficient.

23. The flash memory device method according to claim 9, wherein the garbage collection is performed when a free space is insufficient.

\* \* \* \* \*